United States Patent
Belser et al.

(10) Patent No.: US 9,654,948 B1
(45) Date of Patent: May 16, 2017

(54) SYSTEM AND METHOD FOR DYNAMICALLY FORWARDING VOICE CALLS

(71) Applicant: Sprint Communications Company L.P., Overland Park, KS (US)

(72) Inventors: John E. Belser, Olathe, KS (US); Do Kyu Lee, Overland Park, KS (US); Hannah J. Sifuentes, Lee's Summit, MO (US); Anurag Thantharate, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 306 days.

(21) Appl. No.: 14/156,434

(22) Filed: Jan. 15, 2014

(51) Int. Cl.
*H04Q 7/10* (2006.01)
*H04W 4/16* (2009.01)
*H04W 88/04* (2009.01)

(52) U.S. Cl.
CPC ............. *H04W 4/16* (2013.01); *H04W 88/04* (2013.01)

(58) Field of Classification Search
CPC ..... H04W 36/34; H04W 88/06; H04W 48/18; H04W 48/20
USPC ................... 455/417, 414.1, 435.2, 440, 445
See application file for complete search history.

(56) References Cited

U.S. PATENT DOCUMENTS

| | | | |
|---|---|---|---|
| 6,584,316 B1 | 6/2003 | Akhteruzzaman et al. | |
| 7,551,920 B1 | 6/2009 | Ngan | |
| 7,693,512 B1 | 4/2010 | West | |
| 7,890,090 B2 * | 2/2011 | Hansen | H04M 3/54 455/414.1 |
| 8,423,010 B1 | 4/2013 | Lee et al. | |
| 8,880,047 B2 * | 11/2014 | Konicek | H04M 1/72513 455/414.1 |
| 2006/0135138 A1 * | 6/2006 | Lazaridis | H04M 3/54 455/417 |
| 2007/0099613 A1 * | 5/2007 | Burgan | H04M 3/42246 455/435.2 |
| 2008/0043675 A1 * | 2/2008 | Mousseau | H04L 12/5855 370/331 |
| 2009/0055530 A1 * | 2/2009 | Pince | H04L 29/06027 709/224 |
| 2009/0116443 A1 * | 5/2009 | Walker | H04W 36/30 370/329 |

(Continued)

*Primary Examiner* — Ajit Patel
*Assistant Examiner* — Julio Perez

(57) ABSTRACT

A mobile device comprising a long-range radio transceiver, a first short-range radio transceiver, a processor, a memory, and an application stored in the memory. The application, when executed by the processor, detects an event and in response to detecting the event, selects a reference to a second communication device stored in the memory based on a current location of the mobile communication device, wherein the second communication device comprises a second short-range radio transceiver configured for communication with the first short-range radio transceiver. The application further transmits a redirect message via the long-range radio transceiver to a redirect server application executing on a computer system, wherein the redirect message comprises the reference to the second communication device, whereby voice calls directed to the long-range radio transceiver are redirected to the first short-range radio transceiver via the second short-range radio transceiver of the second communication device.

20 Claims, 7 Drawing Sheets

(56) References Cited

U.S. PATENT DOCUMENTS

2010/0105394 A1* 4/2010 Cheng ................ H04W 36/32
                                                     455/440
2010/0297986 A1   11/2010 Cermak et al.
2012/0165006 A1*  6/2012 Ge ..................... H04W 88/04
                                                     455/423

* cited by examiner

SYSTEM AND METHOD FOR DYNAMICALLY FORWARDING VOICE CALLS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are electronic devices used for mobile voice or data communication based on network connectivity provided by base stations known as cell towers or sites. Electronic devices may obtain network connectivity through base stations with one or more service networks. Mobile communication devices may receive mobile voice and/or data communication through the one or more service networks provided by the base transceiver stations.

SUMMARY

In an embodiment, a mobile communication device is disclosed. The mobile communication device comprises a long-range radio transceiver, a first short-range radio transceiver, a processor, a memory, and an application stored in the memory. When executed by the processor, the application detects an event and in response to detecting the event, selects an entry from a call forwarding map stored in the memory based on a current location of the mobile communication device, wherein the entry comprises a reference to a second communication device, wherein the second communication device comprises a second short-range radio transceiver configured for communication with the first short-range radio transceiver, and wherein the second communication device is different from the mobile communication device. The application further transmits a redirect message via the long-range radio transceiver to a redirect server application executing on a computer system, wherein the redirect message comprises the reference to the second communication device, whereby voice calls directed to the long-range radio transceiver are redirected to the first short-range radio transceiver via the second short-range radio transceiver of the second communication device.

In an embodiment, a mobile communication device is disclosed. The mobile communication device comprises a long-range radio transceiver, a first short-range radio transceiver, a processor, a memory, and an application stored in the memory. When executed by the processor, the application executes a discovery session with a second short-range radio transceiver of a second communication device via the first short-range radio transceiver, wherein the discovery session comprises the first short-range radio transceiver receiving a message comprising a reference to the second communication device from the second short-range radio transceiver. The application further transmits a redirect message via the long-range radio transceiver, wherein the redirect message comprises the reference to the second communication device and a mobile phone number of the mobile communication device, wherein the first short-range radio transceiver, after the application transmits the redirect message, receives a voice call via the second short-range radio transceiver, wherein the voice call was initially directed by a calling party to the mobile phone number of the mobile communication device.

In an embodiment, a method of redirecting a voice call originally directed to a mobile phone number of a mobile communication device is disclosed. The method comprises conducting a discovery session between the mobile communication device and a WiFi access point, wherein the mobile communication device learns an internet protocol address of the WiFi access point and a security code of the WiFi access point. The method further comprises determining that a long-range radio signal strength received by a long-range radio transceiver of the mobile communication device is below a predefined threshold strength level. The method further comprises, in response to determining the long-range radio signal strength is below the predefined threshold, transmitting a redirect message via the long-range radio transceiver, wherein the redirect message comprises the mobile phone number of the mobile communication device, the internet protocol address of the WiFi access point, and the security code of the WiFi access point. The method further comprises, after transmitting the redirect message, receiving a voice call by a WiFi radio transceiver of the mobile communication device from the WiFi access point, wherein the voice call was initially directed by a calling party to the mobile phone number of the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
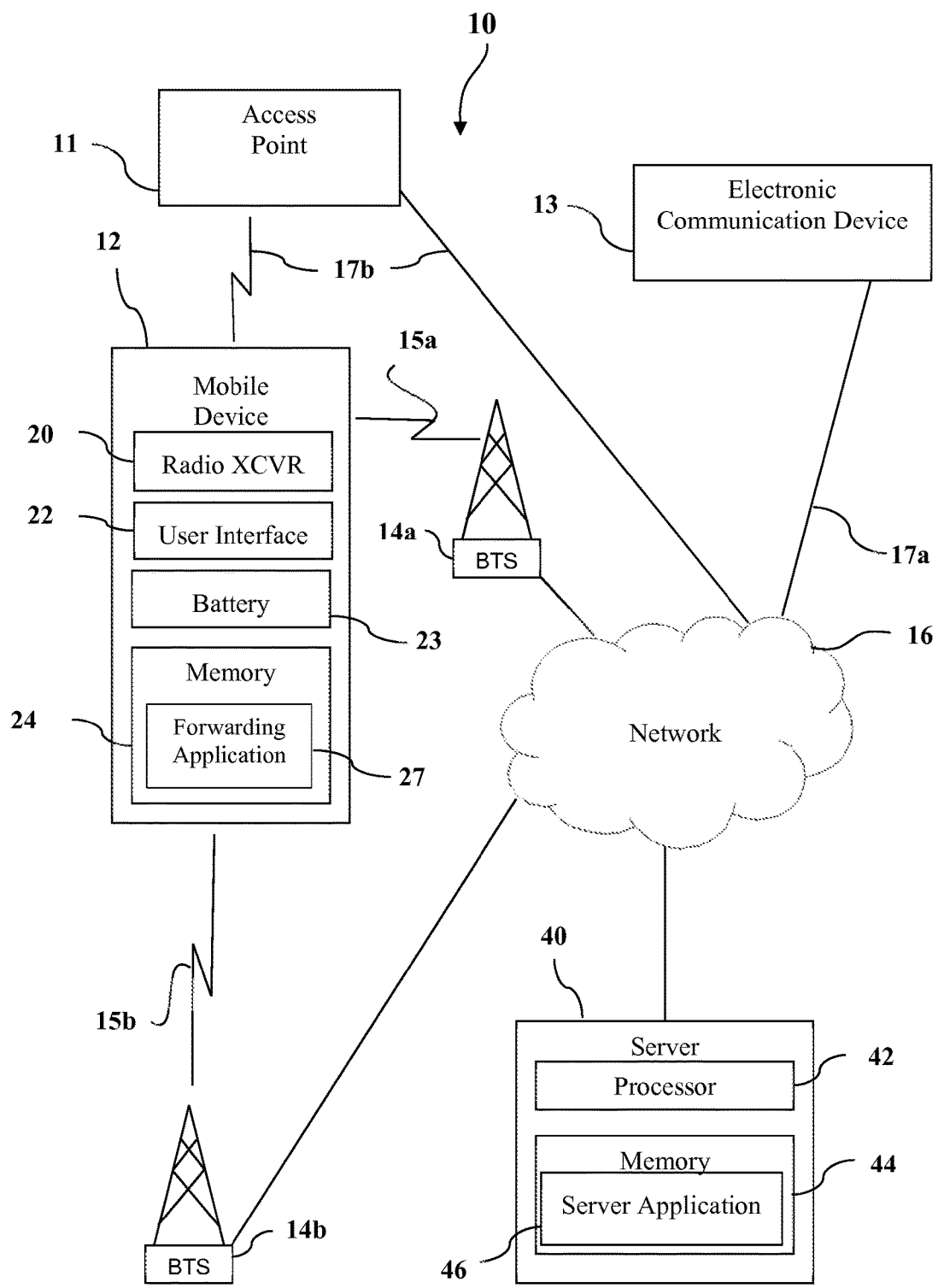
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A forwarding application stored on a mobile communication device detects an event and commands a communication network to forward calls directed to it instead to an alternative device. The detected event may also be referred to as a triggering event, a forwarding trigger event, a triggering condition, or a forwarding trigger condition. For example, a mobile phone detects a low cellular radio signal strength condition and commands the cellular wireless communication network to route phone calls directed to the mobile phone instead to a wireline phone in a residence, for example in the residence of a user of the mobile phone. The forwarding application may detect and respond to a variety of different triggering conditions. For example, a triggering condition may be a low radio signal strength, a determination that the mobile communication device is located at a predefined location, for example a location associated with bad radio reception in the past, or a combination of low radio signal strength and detection that the device is located in the predefined location of the mobile. A triggering condition may be a low battery power level or energy reserve level.

The forwarding application may command the wireless communication network to forward the call to a different device, for example a wireline phone such as an office desk phone or a phone in a residence. Alternatively the forwarding application may command the wireless communication network to forward the call to the same mobile communication device via a different communication channel, for example to forward the call to the same mobile communication device via a WiFi channel to a WiFi transceiver on the mobile communication device. The forwarding application may present a message alerting the user of the mobile communication device that calls are being forwarded to an alternate phone or to the same device via an alternate channel, such as via a WiFi channel. In general, the forwarding application may command the wireless communication network to forward a call using a redirect message, for example sending a redirect message comprising a reference to the alternative access point or alternative phone. The redirect message may comprise additional information, for example a security code or authorization code associated with the access point and/or a time limit during which the network should forward calls based on the redirect message.

The forwarding application may be configured by a user of the mobile communication device to forward calls, when the forwarding trigger condition is detected, to one of a plurality of alternative phones and/or alternative communication channels. The user may create a list that associates alternative phone numbers with locations. Alternatively, the user may create a list of alternative phones, and when a triggering condition is detected, the forwarding application pops a dialog box prompting the user to select an alternative phone number for forwarding calls to from the predefined list of alternative phone numbers. For example, the user may list an office desk phone number, a home landline phone number, a father-in-law landline phone number, a friend's WiFi access point IP address. In some contexts, the phone number of the alternative phone may be referred to as a reference of or a reference to the alternative phone. In some contexts, the IP address or the domain name of an access point may be referred to as a reference of or a reference to the access point.

If the forwarding application detects a low battery level and/or low battery reserve energy capacity, the forwarding application may command the wireless communication network to forward calls. A low battery level may be defined to be battery remaining energy capacity at less than about 20%, at less than about 10%, at less than about 5%, or some other level. When the forwarding application detects that the forwarding trigger condition is no longer present or is no longer active, the forwarding application may command the wireless communication network to resume directing calls to the mobile communication device itself via the cellular wireless network rather than the alternative device or alternative channel. The forwarding application may present a message on a display of the mobile communication device informing the user that once again calls are being routed to the device itself.

In an embodiment, a communication subscriber may register to indicate willingness to host redirected and/or forwarded calls. For example, a father-in-law of the user of the mobile communication device may register with the wireless communication service provider his willingness that phone calls directed to the mobile communication device of his son-in-law be forwarded to his landline phone. In an embodiment, this registration process may include providing a location indication. In an embodiment, the wireless communication network may execute logic to select a forwarding device from a plurality of registered forwarding devices based in part on a location of the mobile communication device. Thus, the forwarding application on the mobile communication device may detect a forwarding triggering condition and command the wireless communication network to forward calls that are directed to the mobile communication device, but delegate to the wireless communication network choosing the device to which to forward calls based on the present location of the mobile communication device and based on the list of registered phones willing to accept forwarded calls from that device. The above functionality may promote the user of the mobile communication device receiving calls that otherwise would be missed or delayed when the mobile communication device is in an area of poor radio reception or when the device has a low battery capacity.

Turning now to FIG. 1, a communication system 10 is described. The system 10 may comprise one or more mobile communication device(s) 12, one or more access points 11 (e.g. wireless routers), one or more electronic communication device(s) 13, base transceiver stations (BTS) 14a and 14b, one or more initial wireless communication channels 15a and/or 15b (e.g. a first communication channel), a network 16, one or more subsequent communication channels 17a and/or 17b (e.g. a second communication channel), and a server 40. The access point 11 may be any device which allows wireless data communication and/or telephonic communication to be transmitted to and/or from a mobile communication device 12. For example, the access point 11 may be a WiFi access point, a Bluetooth access point, a near-field-communication (NFC) access point, or other access point. The access point 11 comprises a radio transceiver that is configured for radio communication over relatively short distances, for example distances of less than a mile, distances of less than 1000 feet, or distances of less than 200 feet. One skilled in the art The access point 11 may receive and/or transmit communication via the subsequent communication channel 17b to and/or from the network 16. The electronic communication device(s) 13 may be a mobile phone, a personal digital assistant (PDA), a media player, a communication enabled portable electronic device, a phone linked to a stationary phone line, a stationary personal computer, a laptop, and/or the like. Computers are discussed in more detail hereinafter.

The electronic communication device 13 may receive and transmit communication via the subsequent communication channel 17a to and/or from the network 16. In an embodiment, an electronic communication device 13 may comprise a router and/or an access point 11.

The mobile communication device 12 may be a mobile phone, a personal digital assistant (PDA), a media player, or other communication enabled portable electronic device. In an embodiment, the mobile device(s) 12 may be implemented as a handset. Details of handsets are discussed further hereinafter. The base transceiver stations 14a and/or 14b may provide initial wireless communication channels 15a and/or 15b via wireless communication links to the mobile device(s) 12 and couples the mobile device(s) 12 to the network 16. In an embodiment, the base transceiver stations 14a and/or 14b may provide wireless communication links to the mobile device(s) 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14a and/or 14b are illustrated in FIG. 1, it is understood that the communication system 10 may comprise two or more base transceiver stations 14 and any number of mobile device(s) 12. The network 16 may be a public communication network, a private communication network, or a combination thereof.

The server 40 may comprise a processor 42, a memory 44, and a server application 46 stored in the memory 44. The server 40 may also comprise a plurality of processors located in a plurality of computers. Computers are discussed in more detail hereinafter. In an embodiment, the server application 46 may be configured by the mobile communication device 12 to activate a redirect function redirecting a communication designated for transmission through an initial wireless communication channel 15a and/or 15b to a subsequent communication channel 17. In some contexts, the server application 46 may be referred to as a redirect server application.

For example, the server application 46 may receive a forwarding signal from a forwarding application 27 on mobile communication device 12 comprising a forwarding instruction instructing the server application 46 to activate a forwarding function redirecting a communication designated for transmission through an initial wireless communication channel 15a and/or 15b (for example, associated with a first electronic communication device) to a subsequent communication channel 17a and/or 17b (for example, associated with a second electronic communication device). In an embodiment, the forwarding instruction may comprise an originating mobile device number (e.g. a phone number) associated with a mobile communication device 12 linked with an initial wireless communication channel 15a and/or 15b which transmitted the forwarding signal as well as a redirected mobile device number (e.g. a phone number) associated with an electronic communication device 13 linked with a subsequent communication channel 17a and/or 17b that is to receive redirected communication.

In an embodiment, the forwarding instruction may provide an originating digital address (e.g. a URL, a unique identifier, a network node identification, a mobile device identification, an identification providing a specific type of mobile communication from a mobile communication device 12, another type of network address, and/or the like) associated with the initial wireless communication channel 15a and/or 15b which the server application 46 received the forwarding instruction from as well as a redirected digital address (e.g. a URL, a unique identifier, a network node identification, a mobile device identification, an identification providing a specific type of mobile communication to an electronic communication device 13, another type of network address, and/or the like) associated with the subsequent communication channel 17a and/or 17b. The server application 46 may use the originating mobile device number, the redirected mobile device number, the originating digital address, and/or the redirected digital address from the forwarding instruction to identify the proper communications channels for the proper communications. Upon receiving the forwarding signal, the server application 46 may activate a forwarding function to redirect any communication designated for the initial wireless communication channel 15a and/or 15b to the subsequent communication channel 17a and/or 17b.

It should be understood that a unique identifier is a unique string of characters assigned to each mobile communication device 12. Because mobile communication devices 12 may use different technologies, unique identifiers may be expressed in a variety of formats. For example, mobile communication devices 12 manufactured to use the code division multiple access (CDMA) technology receive a unique identifier called a mobile equipment identifier (MEID). The unique identifier for mobile communication devices 12 manufactured with the global system for mobile communications (GSM) or universal mobile telecommunications system (UMTS) technologies is called an international mobile subscriber identity (IMSI). Mobile communication devices 12 manufactured using the integrated digital enhanced network (iDEN) technology receive a unique identifier called an international mobile equipment identity (IMEI). In the cases described using these technologies, the unique identifiers are associated with the hardware of the mobile communication device 12 and the unique identifiers do not normally change. In an embodiment, some mobile communication devices 12 are assigned unique identifiers by the wireless service providers selling the mobile communication devices 12 and for purposes of the discussion of the present disclosure, these assigned unique identifiers are recognized and used by the components of the system 10. Unique identifiers may be provided in origination messages to establish voice and/or data calls and/or sessions.

In an embodiment, the server application 46 may be configured to deactivate a forwarding function thereby allowing communication designated for the initial wireless communication channel 15a and/or 15b to be directed back to and/or through the initial wireless communication channel 15a and/or 15b to the mobile communication device 12. For example, the server application 46 may receive a deactivation signal from a forwarding application 27 on mobile communication device 12 comprising a deactivation instruction instructing the server application 46 to deactivate a forwarding function. By deactivating the forwarding function, a communication designated for the initial wireless communication channel 15a and/or 15b is no longer redirected to the subsequent communication channel 17a and/or 17b. Instead, a communication designated for the initial wireless communication channel 15a and/or 15b is again directed to the initial wireless communication channel 15a and/or 15b. The deactivation instruction may comprise the originating mobile device number, the redirected mobile device number, the originating digital address, and/or the redirected digital address so that the server application 46 may identify which forwarding function has been requested for deactivation.

It should be understood that a server application 46 may receive multiple forwarding signals before receiving a deactivation signal. For example, a server application 46 may receive a first forwarding signal from a forwarding application 27 on a mobile communication device 12 redirecting communication to a first subsequent communication channel, such as subsequent communication channel 17*a*. The server application 46 may then receive a second forwarding signal from the forwarding application 27 on the mobile communication device 12 redirecting communication to a second subsequent communication channel, for example, subsequent communication channel 17*b*. In an embodiment, the second forwarding instruction of the second forwarding signal may comprise the originating mobile device number, a second redirected mobile device number, the originating digital address, and/or a second redirected digital address. The second redirected mobile device number and/or the second redirect digital address may be associated with the second subsequent communication channel 17*b*. By receiving an originating and second redirected mobile device number and/or a digital address, the server application 46 may identify the proper communications channels for the proper communications. Upon receiving the second forwarding signal, the server application 46 may activate a forwarding function to redirect any communication designated for the initial wireless communication channel 15*a* and/or 15*b* to the second subsequent communication channel 17*b*.

In an embodiment, the second forwarding instruction may also comprise the first redirected mobile device number and/or the first redirected digital address. The first redirected mobile device number and/or the first redirected digital address may be associated with the first subsequent communication channel 17*a*. By receiving a first redirected mobile device number and/or a first redirected digital address, the server application 46 may more precisely identify the proper communications channels for the proper redirection of communications.

The mobile communication device 12 may comprise a radio transceiver 20, a user interface 22, a battery 23, and a memory 24. Alternatively, the mobile communication device 12 may comprise two or more radio transceivers 20. In an embodiment, at least one radio transceiver 20 may be configured to communicatively couple the mobile communication device 12 to a network 16 (e.g. a radio access network) by at least the initial wireless communication channel 15*a* and/or 15*b*. For example, the radio transceiver 20 may provide a wireless communication link between the base transceiver station 14 and the device 12 based on a code division multiple access (CDMA) wireless communication protocol, a global system for mobile communication (GSM) wireless communication protocol, a long-term evolution (LTE) wireless communication protocol, a worldwide interoperability for microwave access (WiMAX) wireless communication protocol, or based on another wireless communication protocol. In some contexts, the radio transceiver 20 that communicates with the BTS 14 may be referred to as a long-range radio transceiver, and may communicate with the BTS 14 over relatively long distances. For example, the long-range radio transceiver may communicate with the BTS 14 over distances of at least 2000 feet, of at least 1 mile, of at least 3 miles, or over longer distances. Another radio transceiver 20 may comprise a short-range radio transceiver, for example a WiFi radio transceiver, a Bluetooth radio transceiver, or a near-field-communication transceiver. The memory 24 may store a forwarding application 27. As will be discussed further herein, the forwarding application 27 may be configured to automatically forward communication designated for transmission through an initial wireless communication channel 15*a* and/or 15*b* associated with the mobile communication device 12 to a subsequent communication channel 17*a* and/or 17*b* capable of providing voice and/or data communication to a location associated with the location of the mobile communication device 12.

In an embodiment, the forwarding application 27 may be configured to detect the receipt of a signal from the network 16 to the radio transceiver 20 through an initial wireless communication channel 15*a* and/or 15*b* communicatively coupling the mobile communication device 12 to the network 16. The forwarding application 27 may be configured to determine and/or measure the strength of the received signal. In an embodiment, the signal strength is determined and/or measured by the magnitude of a received signal strength indicator (RSSI) number associated with the received signal. The received signal strength indicator is a measurement of the power present in a received radio signal. The higher the received signal strength indicator number, the stronger the signal. In an embodiment, the forwarding application 27 may compare the signal strength of the received signal with a signal strength threshold to determine whether to transmit a forwarding signal, as will be discussed further herein.

In an embodiment, the forwarding application 27 may determine the current location of the mobile communication device 12. For example, the mobile communication device 12 may determine its current location using one or more location identification techniques. Location identification techniques may comprise using a global positioning system (GPS), trilateration and/or coarse grained location of the mobile communication device 12 based on a serving cell sector, and/or other self-locating mechanism embedded in the mobile communication device 12.

In an embodiment, the forwarding application 27 may determine the current location of the mobile communication device 12 when the forwarding application 27 determines and/or measures the strength of the received signal and determines that the signal strength is below a threshold. For example, a businessman may have been walking from his car to his office door. While walking, a forwarding application 27 stored in the businessman's mobile communication device 12 may have a signal strength above the threshold signal strength. However, once the businessman walks through the door, the construction of the building where his office is located weakens the strength of the signal received by the mobile communication device 12 so that the signal strength falls below the threshold. The forwarding application 27 may determine and/or measure the signal strength of the received signal and determine that the signal strength received by the mobile communication device 12 has fallen below the threshold. The forwarding application 27 may then determine the location of the mobile communication device 12.

Based on the location of the mobile communication device 12, the forwarding application 27 may identify one or more subsequent communication channels 17*a* and/or 17*b*, one or more electronic communication device(s) 13 associated with the location of the mobile communication device 12, and/or one or more access points 11 associated with the location of the mobile communication device 12. In an embodiment, the forwarding application 27 may identify one or more subsequent communication channels 17*a* and/or 17*b*, one or more electronic communication device(s) 13, and/or one or more access points 11 within a predetermined distance of the mobile communication device 12. The forwarding application 27 may determine the location of the mobile communication device 12 and locate a land-line and/or a WLAN providing internet connection within a predetermined distance of the mobile communication device 27, within the same room, and/or within the same area defined by walls and/or predetermined borders so that if a call is transmitted through the subsequent communication channels 17*a* and/or 17*b*, the mobile communication device owner and/or someone who may be able to inform the mobile communication device owner may hear and/or see that the subsequent communication channels 17*a* and/or 17*b* is receiving a telephone call.

In an embodiment, the forwarding application 27 may identify an alternative communication channel from a calling party to the same device 12, for example to a WiFi radio transceiver of the device 12 via the access point 11. Alternatively, the forwarding application may identify an alternative communication channel from the calling party to the user of the device 12 via a different communication device (e.g., electronic communication device 13), for example a landline phone in the user's father-in-law's house. Thus, the forwarding application 27 may identify one or more subsequent communication channels 17*a* and/or 17*b*. In an embodiment, the forwarding application 27 may identify a subsequent communication channel 17*a* and/or 17*b* associated with the same mobile communication device 12 as the initial wireless communication channel 15*a* and/or 15*b*. For example, a mobile communication device 12 comprising a forwarding application 27 may also be configured to receive data through an internet connection via a WLAN such as wireless communication channel 17*b*, for example through a short-range radio transceiver of the device 12 sent via the access point 11. In some contexts, the WLAN signal may be referred to as a short-range radio signal, for example a WiFi signal, a Bluetooth signal, a near-field-communication signal, or other short-range radio signal.

In an embodiment, the forwarding application 27 may conduct a discovery session with the access point 11. For example, a short-range radio transceiver of the device 12 may transmit a message to the access point 11 querying the access point 11 for relevant information, for example a reference or address of the access point 11. The message or a subsequent message may request a security code or authorization code associated with the access point 11. Alternatively, the forwarding application 27 may pop-up a dialog box on a display of the device 12 prompting the user of the device 12 to input the security code or authorization code (e.g., the security code or authorization code is conveyed orally to the son-in-law who is the user of the device 12 by his father-in-law who is the owner of the access point 11). The forwarding application 27 may build a redirect message based on the information learned during the discovery session and send this to the server application 46. It is understood that the discovery session may comprise a plurality of messages passing between both the device 12 and the access point 11.

The discovery session may be initiated by the forwarding application 27 based on detecting a short-range radio signal transmitted by the access point 11 and also based on an event, such as a triggering event such as low RSSI value, such as low battery power level, such as the location of the device 12. Thus, the discovery session may happen opportunistically and without preconfiguring the set-up for the alternative communication channel.

The mobile communication device 12 may also have an internet phone number associated with it so that the mobile communication device 12 may receive data communication and/or telephonic communication via the internet. The forwarding application 27 may identify that a signal received through an initial wireless communication channel 15*a* and/or 15*b* comprises a signal strength which has fallen below a signal strength threshold. Upon identifying that the signal received through the initial wireless communication channel 15*a* and/or 15*b* comprises a signal strength which has fallen below the signal strength threshold, the forwarding application 27 may detect that the mobile communication device 12 is receiving a WLAN signal. The forwarding application 27 may determine and/or measure the strength of the WLAN signal and determine that a subsequent communication channel 17*b* through the access point 11 would be a feasible or viable subsequent communication channel 17*a* and/or 17*b*, for example, because the WLAN signal provides a signal strength adequate for receiving voice and/or data communications. The forwarding application 27 may also identify that the mobile communication device 12 comprises the internet telephone number and that the subsequent communication channel 17*b* may link mobile communication device 12 to the network 16.

In an embodiment, the forwarding application 27 may be configured to access a map stored on the mobile communication device 12 and/or on a remote server, such as server 40. The map may identify other access points 11 and/or other electronic communication device(s) 13 located within a predetermined distance of the mobile communication device 12. For example, a mobile communication device 12 comprising a forwarding application 27 may detect that a signal strength received by the mobile communication device 12 is below a signal strength threshold. The forwarding application 27 may access a map and identify one or more access points 11 and/or other electronic communication devices 13 located within a predetermined distance of the mobile communication device 12 and/or within an identified area and linked to the network 16 via a subsequent communication channel 17*a* and/or 17*b*.

The forwarding application 27 may transmit a searching signal searching for subsequent communication channels 17*a* and/or 17*b*, access points 11, and/or electronic communication devices 13. Upon finding/identifying one or subsequent communication channels 17*a* and/or 17*b*, access points 11, and/or electronic communication devices 13, the forwarding application 27 may identify and/or select the subsequent communication channel 17*a* and/or 17*b* with the least data communication and/or telephonic communication interference, the subsequent communication channel 17*a* and/or 17*b* linked to a access point 11 and/or electronic communication device 13 closest the mobile communication device 12, and/or provide a menu on the user interface 22 listing all the identified subsequent communication channels 17*a* and/or 17*b*, access points 11, and/or electronic communication devices 13 so that the mobile communication device owner and/or user may select a subsequent communication channel 17*a* and/or 17*b*, an access point 11, or an electronic communication device 13.

In an embodiment, the forwarding application 27 may pop a dialog box when a forwarding triggering condition is detected and prompt the user to enter a forwarding number. Alternatively, the dialog box may prompt the user to select a forwarding number from a plurality of forwarding numbers previously configured by the user on the mobile communication device 12. The forwarding application 27 may send the forwarding number with a command to the server application 46. The forwarding application 27 may also send a security code or an authorization code associated with the forwarding number, for example associated with the access point 11, and optionally a time limit value. The server application 46 may use the security code or authorization code to route calls to the access point 11, for example sending the security or authorization code to the access point 11. The server application 46 may perform forwarding of calls initially directed to the device 12 to the forwarding number during a period of time defined by the optional time limit value.

Alternatively, subscribers of other devices may register their willingness to host calls forwarded by the mobile communication device 12. The registration may comprise a phone number of the device 13 or an IP address of a WiFi access point, for example access point 11, as well as a location. In an embodiment, the server application 46 may select the device 13 from a plurality of registered electronic communication devices 13 willing to host forwarded calls, where the selection is based on a known location of the wireless communication device 12 and the locations of the registered electronic communication devices 13.

In an embodiment, the forwarding application 27 may access a list of authorized subsequent communication channels 17a and/or 17b which are associated with the current location of the mobile communication device 12. For example, a mobile communication device owner may have provided a list for example through a computer terminal and/or a website identifying authorized subsequent communication channels 17a and/or 17b, authorized access point 11, and/or authorized electronic communication devices 13 that the mobile device owner wishes to have communication forwarded to when the mobile communication device 12 is located in a particular area and when the signals received by the mobile communication device 12 fall below a signal strength threshold. The list may be located on the mobile communication device 12 and/or in the server 40. For example, a businessman may have an office that does not receive strong wireless signals, so much so, that when the mobile communication device 12 is located in the businessman's office, the forwarding application 27 stored on the mobile communication device 12 detects that the signals received by the mobile communication device 12 are below the signal strength threshold.

The mobile communication device owner may have authorized a phone number associated with his office phone to receive forwarded data communication and/or telephonic communication when the mobile communication device 12 is at least within the building where his office is located when the signal strength falls below the signal strength threshold. Thus, when the mobile communication device 12 is carried into the building, for example, by the businessman, and signals received by the mobile communication device 12 are determined and/or measured by the forwarding application 27 to be below the signal strength threshold, the forwarding application 27 may access a list of authorized subsequent communication channels 17a and/or 17b comprising the businessman's office phone number and identify that the current location of the mobile communication device 12 is associated with the businessman's office phone number.

In an embodiment, the subsequent communication channels 17a and/or 17b may be authorized by entering redirected device numbers and/or redirected device addresses of subsequent communication channels 17a and/or 17b, access points 11, and/or electronic communication devices 13 into a webpage associated with the mobile communication device 12 for forwarding. In an embodiment, the subsequent communication channels 17a and/or 17b may be authorized by transmitting a signal from the subsequent communication channels 17a and/or 17b to the server 40. For example, the businessman may have moved to a new office with a new phone number. The businessman may wish to set up call forwarding from his mobile communication device 12 to his office phone when for example signals received by the mobile communication device 12 fall below a signal strength threshold.

The mobile communication device owner may then use the office phone to call a number and provide an authorization code or security code authorizing the subsequent communication channel 17a and/or 17b to receive calls forwarded from the mobile communication device 12. In an embodiment, the subsequent communication channels 17a and/or 17b, an access point 11, and/or an electronic communication device 13 may be authorized to receive forwarded calls for a finite amount of time, for an indefinite amount of time, beginning and ending at predetermined time, only certain times of day, days of the week, weeks of the month, months of the year, and/or any combination thereof, for example at the mobile communication device owner's and/or the subsequent communication channel's 17a and/or 17b, access point's 11, and/or an electronic communication device's 13 owner agreed to and/or specified period of time(s).

Alternatively, the mobile device owner may access a webpage associated with the mobile communication device 12 and provide one or more redirected mobile device numbers and/or one or more redirected digital addresses associated with subsequent communication channels 17a and/or 17b, one or more access points 11, and/or one or more electronic communication devices 13 along with an authorization code associated with the subsequent communication channels 17a and/or 17b, an access point 11, and/or an electronic communication device 13. Similar to at least one previously described embodiment, the subsequent communication channels 17a and/or 17b, an access point 11, and/or an electronic communication device 13 may be authorized to receive forwarded calls for a finite amount of time, for an indefinite amount of time, beginning and ending at predetermined time, only certain times of day, days of the week, weeks of the month, months of the year, and/or any combination thereof, for example at the mobile communication device owner's and/or the subsequent communication channel's 17a and/or 17b, access point's 11, and/or an electronic communication device's 13 owner agreed to and/or specified period of time(s). This feature may protect subsequent communication channels 17a and/or 17b, an access point 11, and/or an electronic communication device 13 from receiving unwanted and/or unauthorized calls forwarded from mobile communication devices 12.

In an embodiment, the authorization code may comprise a code or identifier associated with the owner of the access point 11, electronic communication device 13, and/or the subsequent communication channels 17a and/or 17b. For example, in order for the businessman to authorize the businessman's office phone for mobile communication device forwarding, the businessman may call a phone number associated with call forwarding and/or access a webpage associated with call forwarding for the mobile communication device 12 and provide an account number associated with the office phone and given to him when he purchased the service for the office phone. In an embodiment, the authorization code may comprise at least part of a social security number and/or other confidential number associated with the office phone service account. Thus, no unwanted and/or unauthorized mobile communication devices 12 may forward calls to subsequent communication channels 17a and/or 17b, an access point 11, and/or an electronic communication device 13 without permission from the owners of the subsequent communication channels 17a and/or 17b, access point 11, and/or electronic communication devices 13.

Based on the location of the mobile communication device 12, the forwarding application 27 may identify one or more subsequent communication channels 17a and/or 17b, one or more electronic communication device(s) 13 associated with the location of the mobile communication device 12, and/or one or more access points 11 associated with the location of the mobile communication device 12. In an embodiment, the forwarding application 27 may identify one or more subsequent communication channels 17a and/or 17b, one or more electronic communication device(s) 13, and/or one or more access points 11 at a location associated with the location of the mobile communication device 12. In an embodiment, the location of the mobile communication device 12 may be associated with a location different from the location of the mobile communication device 12.

For example, a businessman may have a mobile communication device 12 for strictly business purposes. The businessman may have conveyed, for example, to the server 40 that when the businessman is at home, calls and/or text messages which are sent to his mobile communication device 12 used strictly for business purposes are forwarded to his office phone number located at his office and a different location from his home, when the signal falls below the signal strength threshold, so that a message recording machine can record messages for retrieval the next day. Thus, when the forwarding application 27 detects that a signal received by the mobile communication device 12 used for business purposes is below a signal strength threshold, calls and/or text messages to the mobile communication device 12 for business purposes can be forwarded to the office phone number.

In an embodiment, the forwarding application 27 may transmit a forwarding signal comprising a forwarding instruction that instructs the server 40 and/or the server application 46 to block the redirection of communication designated for transmission through the initial communication channel to the subsequent communication channel when a communication source has blocked the transmission of a communication source identification associated with the communication, wherein the communication source identification provides an identification of the communication source to a communication receiver. For example, a businessman may not want communication from a source, such as a telemarketer, that has blocked the transmission of caller identification to be redirected to a subsequent communication channel 17a and/or 17b. The businessman may configure forwarding instructions to block the redirection of communications that have blocked the source of the communication so that only communication which may be identified by, for example, caller identification may be redirected.

In an embodiment, the forwarding application 27 may provide a menu, for example on a user interface 22, for selecting a particular subsequent communication channel 17a and/or 17b, an access point 11, and/or an electronic communication device 13 of a plurality of any one or more of the above. The forwarding application 27 may detect that the signal received by the mobile communication device 12 has fallen below a signal strength threshold and the forwarding application 27 may determine the location of the mobile communication device 12. The forwarding application 27 may provide a menu with a list of subsequent communication channels 17a and/or 17b, access point 11, and/or an electronic communication device 13 near the location of the mobile communication device 12 and/or at a location associated with the location of the mobile communication device 12. In an embodiment, the forwarding application 27 may provide a menu with a list of subsequent communication channels 17a and/or 17b, access point 11, and/or an electronic communication device 13 at a location away from the mobile communication device 12. In an embodiment, the forwarding application 27 may provide a menu so that a mobile communication device user may override the transmission of a forwarding signal, so that when the signal strength falls below a threshold, the forwarding application 27 may not transmit a forwarding signal until the mobile communication device user permits the forwarding application to do so.

In an embodiment, the forwarding application 27 may be configured to provide a notification, for example, on the user interface 22 before and/or after transmitting a forwarding signal to the server 40. For example, the forwarding application 27 may provide a notification that signals received through the initial wireless communication channel 15a and/or 15b have fallen below the signal strength threshold. The forwarding application 27 may also provide a notification indicating that calls and/or text messages will be sent to a particular subsequent communication channel 17a and/or 17b. In an embodiment, the forwarding application 27 may provide a notification that signals received through the initial wireless communication channel 15a and/or 15b have fallen below the signal strength threshold.

In an embodiment, when the forwarding application 27 detects that the signal strength received by the mobile communication device 12 rises above the signal strength threshold, the forwarding application 27 may transmit a deactivation signal to the server 40 comprising deactivation instructions. Similar to at least one previously described embodiment, the deactivation instructions may instruct the server application 46 to deactivate a forwarding function. By deactivating the forwarding function, a communication designated for the initial wireless communication channel 15a and/or 15b is no longer redirected to the subsequent communication channel 17a and/or 17b. Instead, a communication designated for the initial wireless communication channel 15a and/or 15b is again directed to the initial wireless communication channel 15a and/or 15b. The deactivation instruction may comprise the originating mobile device number, the redirected mobile device number, the originating digital address, and/or the redirected digital address so that the server application 46 may identify which forwarding function has been requested for deactivation.

In an embodiment, the forwarding application 27 may transmit another forwarding signal comprising a forwarding instruction directing the server 40 and/or the server application 46 to forward communications from a first subsequent communication channel 17a to a second subsequent communication channel 17b, when the location of the mobile communication device 12 has changed. For example, a businessman may be located in an office so that a mobile communication device 12 receives a signal comprising a signal strength below the signal strength threshold. The forwarding application 27 may determine the location of the mobile communication device 12. The forwarding application 27 may detect the signal strength received by the mobile communication device 12 and transmit a forwarding signal to a server 40 and/or server application 46 to forward communication from an initial wireless communication channel 15*a* and/or 15*b* to a first subsequent communication channel 17*a* associated with the location of the mobile communication device 12. Communications designated for the initial wireless communication channel 15*a* and/or 15*b* may be redirected from the initial wireless communication channel 15*a* and/or 15*b* to the first subsequent communication channel 17*a*.

The businessman and his mobile communication device 12 may then move to a different location within the office or outside the office without receiving a signal comprising a signal strength that is no longer below the signal strength threshold. The forwarding application 27 may detect that the signal strength received by the mobile communication device 12 is still below the signal strength threshold and transmit a forwarding signal to a server 40 and/or server application 46 to forward communication from the first subsequent communication channel 17*a* to a second subsequent communication channel 17*b* associated with the new location of the mobile communication device 12. Communications designated for the first subsequent communication channel 17*a* may then be redirected from the first subsequent communication channel 17*a* to the second subsequent communication channel 17*b*.

In an embodiment, the forwarding application 27 may periodically transmit forwarding signals identifying the same originating mobile device number, the same redirected mobile device number, the same originating digital address, and/or the same redirected digital address so that the server application 46 may maintain the forwarding of calls and/or text messages from an initial wireless communication channel 15*a* and/or 15*b* to a subsequent communication channel 17*a* and/or 17*b*. For example, a forwarding application 27 on a mobile communication device 12 may transmit a forwarding signal every about 20 seconds, every about 5 minutes, every about 15 minutes, every about 60 minutes, or some other time period to a server 40 and/or a server application 46 comprising a forwarding instruction so that the server 40 and/or the server application 46 does not remove/deactivate the forwarding instruction and redirect calls and/or text messages from the subsequent communication channel 17*a* and/or 17*b* back to the initial wireless communication channel 15*a* and/or 15*b*.

The server 40 and/or the server application 46 may be configured to deactivate a forwarding instruction after a predetermined period of time after receiving a forwarding signal. The predetermined period of time after receiving the forwarding signal may comprise no less than a tenth of second, no less than half a second, no less than one second, no less than 10 seconds, no less than 20 seconds, no less than 30 seconds, no less than one minute, no less than 2 minutes, no less than 5 minutes, no less than 10 minutes, no less than 15 minutes, no less than 60 minutes, and/or the like. In an embodiment, when the server 40 and the server application 46 are configured to maintain a forwarding instruction based on receiving periodic forwarding signals, the forwarding application 27 may be configured to send a maintaining forwarding signal comprising a maintaining forwarding instruction, for example, before the mobile communication device 12 loses all signal strength and/or when the mobile communication device 12 receives a signal with the minimum amount of strength to transmit a forwarding signal and/or a maintaining forwarding signal.

In an embodiment, in addition to and/or in an alternative to the forwarding application 27 detecting the receipt of a signal from the radio access network to the radio transceiver 20 through the initial wireless communication channel 15*a* and/or 15*b*, measuring the signal strength associated with the signal, and transmitting a forwarding signal when the signal strength is below a signal strength threshold, the forwarding application 27 may detect an amount of charge and/or stored energy remaining in the battery 23. In an embodiment, an amount of charge and/or stored energy remaining in the battery 23 in some contexts may be referred to as remaining battery life. The forwarding application 27 may transmit a forwarding signal to a server 40 when the amount of charge remaining in the battery is below a battery charge threshold. For example, a businessman may use his mobile communication device 12 for sending and/or receiving emails with clients and/or business associates while he is away from a desktop or a laptop computer. The businessman may have several emails he wishes to send to his clients, but because he is away from his desktop computer and/or laptop computer, he may use his mobile communication device 12 to draft and transmit those emails. The mobile communication device 12 may be getting low on battery life so that if the businessman receives a few calls, his mobile communication device 12, may not have enough battery life for the businessman to draft and transmit the emails as well.

The forwarding application 27 may detect an amount of charge remaining in the battery 23 of the mobile communication device 12. When the forwarding application 27 detects that the amount of charge remaining in the battery falls below a battery charge threshold, the forwarding signal is transmitted from the forwarding application 27 to the server 40 and/or the server application 46, similarly to previous embodiments. Thus, for example, when the businessman's mobile communication device 12 fails below a battery life threshold, the forwarding application 27 may detect that the amount of battery life has fallen below a battery life threshold. The forwarding application 27 may also determine the location of the mobile communication device 12 and transmit a forwarding signal to a server 40 and/or a server application 46 to forward communication such as calls and/or text messages from an initial wireless communication channel 15*a* and/or 15*b* to a subsequent communication channel 17*a* and/or 17*b* associated with the location of the mobile communication device 12. Therefore, the businessman's mobile communication device 12 may retain enough battery life so that the emails may be drafted and transmitted before the mobile communication device 12 loses enough battery life to function.

Figure 2:
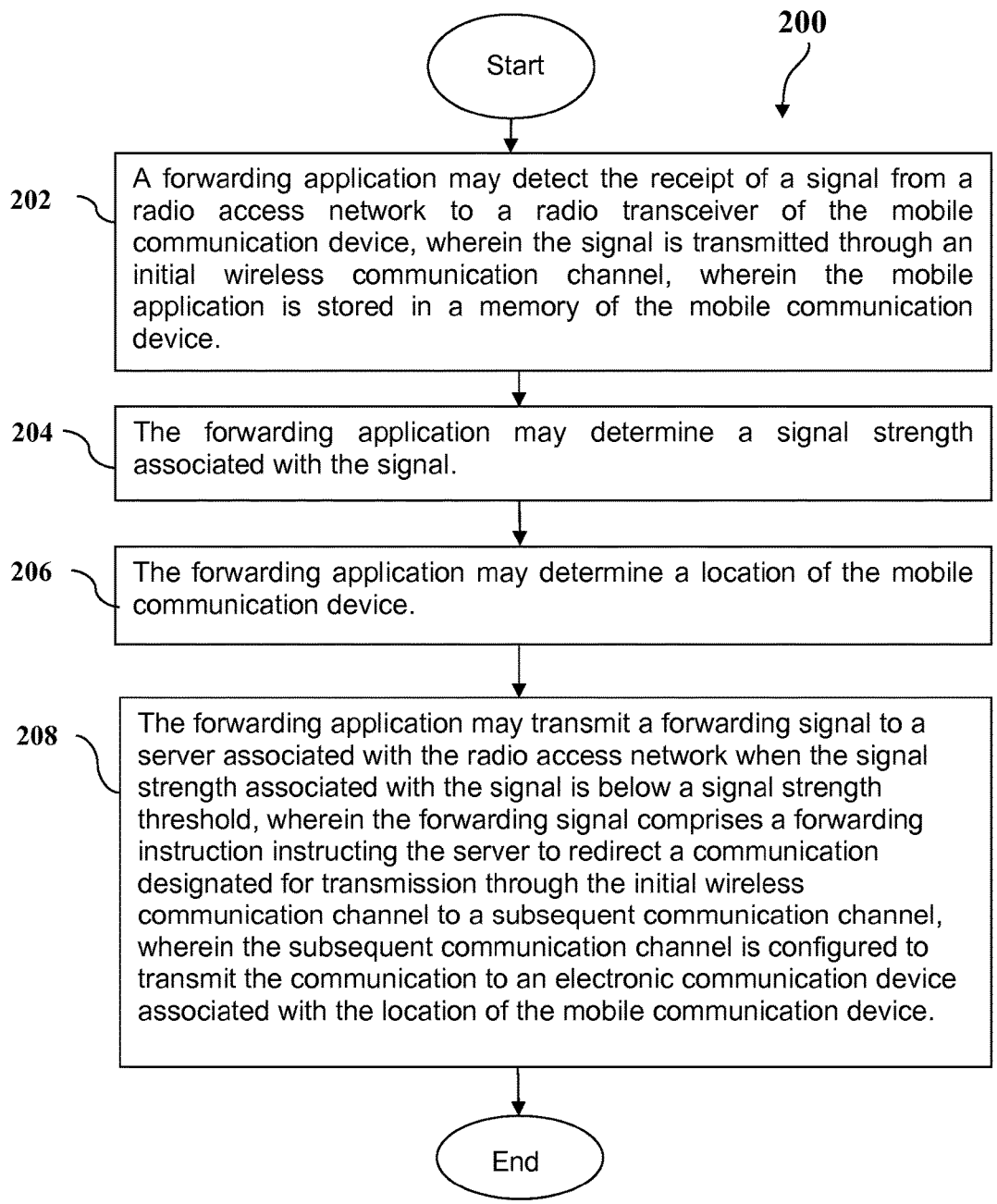
FIG. 2 is a flow chart of a method according to an embodiment of the disclosure.

In FIG. 2, a method 200 is disclosed. At block 202, a forwarding application 27 may detect the receipt of a signal from a radio access network to a radio transceiver 20 of the mobile communication device 12, wherein the signal is transmitted through an initial wireless communication channel 15*a* and/or 15*b*, wherein the forwarding application 27 is stored in a memory 24 of the mobile communication device 12. At block 204, the forwarding application 27 may determine and/or measure a signal strength associated with the signal. In an embodiment, the radio transceiver 20 of the mobile device 12 may determine and/or measure the signal strength and provide a digital value of signal strength that is available to applications on the mobile device 12, for example, to the forwarding application 27. The radio transceiver 20 may update the digital value of signal strength periodically. At block 206, the forwarding application 27 may determine a location of the mobile communication device 12. At block 208, the forwarding application 27 may transmit a forwarding signal to a server 40 associated with the radio access network when the signal strength associated with the signal is below a signal strength threshold, wherein the forwarding signal comprises a forwarding instruction instructing the server 40 to redirect a communication designated for transmission through the initial wireless communication channel 15a and/or 15b to a subsequent communication channel 17, wherein the subsequent communication channel 17 is configured to transmit the communication to an electronic communication device 13 associated with the location of the mobile communication device 12.

In an embodiment, the method 200 may comprise that the forwarding instruction instructs the server 40 to redirect a communication source identification designated for transmission through the initial communication channel 15a and/or 15b to the subsequent communication channel 17, wherein the communication source identification is associated with the communication, and wherein the communication source identification provides an identification of the communication source to a communication receiver. In an embodiment, the method 200 may comprise that the forwarding application 27 provides a forwarding notification to a mobile communication device owner before transmitting the forwarding signal, wherein the forwarding notification informs the mobile communication device owner that the signal strength associated with the signal has fallen below the signal strength threshold and that communications will be redirected.

In an embodiment, the method 200 may comprise that the subsequent communication channel 17 comprises at least one of a wireless communication channel or a wired communication channel. In an embodiment, the method 200 may comprise that the subsequent communication channel 17 comprises a communication channel to a different communication device than the wireless communication device 12. In an embodiment, the method 200 may comprise that the initial communication channel 15a and/or 15b and the subsequent communication channel 17 direct communication to the wireless communication device 12.

In an embodiment, the method 200 may comprise that the forwarding instruction instructs the server 40 to redirect a communication source identification designated for transmission through the initial communication channel 15a and/or 15b to the subsequent communication channel 17, wherein the communication source identification is associated with the communication, and wherein the communication source identification provides an identification of the communication source to a communication receiver. In an embodiment, the method 200 may comprise that the forwarding instruction instructs the server 40 to block the redirection of communication designated for transmission through the initial communication channel 15a and/or 15b to the subsequent communication channel 17 when a communication source has blocked the transmission of a communication source identification associated with the communication, wherein the communication source identification provides an identification of the communication source to a communication receiver.

In an embodiment, the method 200 may comprise that the forwarding application 27 provides a forwarding notification to a mobile communication device owner before transmitting the forwarding signal, wherein the forwarding notification informs the mobile communication device owner that the signal strength associated with the signal has fallen below the signal strength threshold and that communications will be redirected. In an embodiment, the method 200 may comprise that the forwarding notification provides a list of one or more communication channels associated with the location of the mobile communication device 12, wherein the list of one or more communication channels comprises the subsequent communication channel 17, and wherein the mobile communication device owner chooses the subsequent communication channel 17 from the list of one or more communication channels.

In an embodiment, the method 200 may comprise that the list of one or more communication channels comprises channels previously identified by the mobile communication device user and/or owner as communication channels associated with the location. In an embodiment, the method 200 may comprise that the forwarding application 27 provides a notification after transmitting the forwarding signal identifying that communication is being redirected from the initial communication channel 15a and/or 15b to the subsequent communication channel 17.

Figure 3:
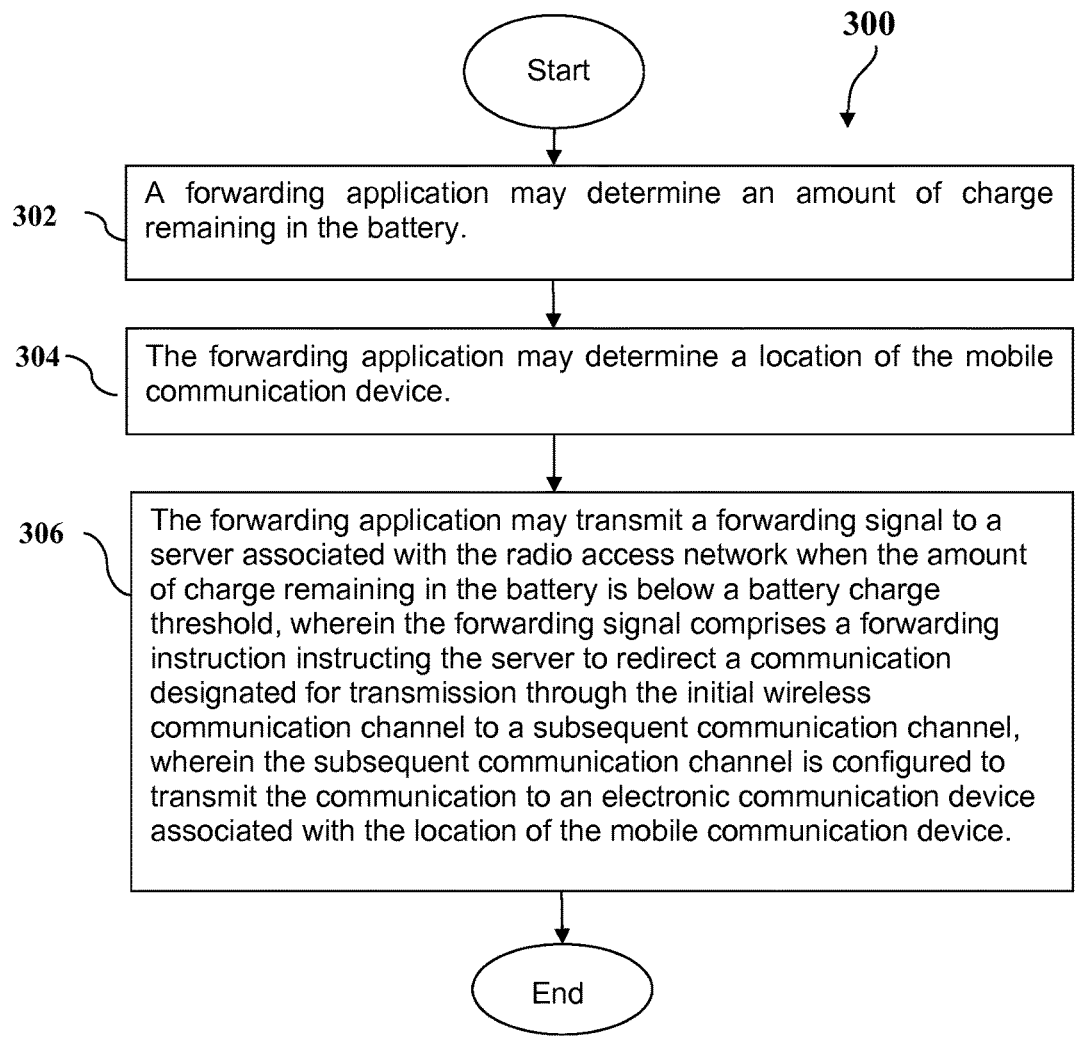
FIG. 3 is a flow chart of a method according to an embodiment of the disclosure.

In FIG. 3, a method 300 is disclosed. At block 302, a forwarding application 27 may determine and/or measure an amount of charge remaining in the battery 23. At block 304, the forwarding application 27 may determine a location of the mobile communication device 12. At block 306, the forwarding application 27 may transmit a forwarding signal to a server 40 associated with the radio access network when the amount of charge remaining in the battery 23 is below a battery charge threshold, wherein the forwarding signal comprises a forwarding instruction instructing the server 40 to redirect a communication designated for transmission through the initial wireless communication channel 15a and/or 15b to a subsequent communication channel 17, where in the subsequent communication channel 17 is configured to transmit the communication to an electronic communication device 13 associated with the location of the mobile communication device 12.

In an embodiment, the method 300 may comprise that the battery charge threshold comprises a battery charge which is no greater than about 20% of the charge when the battery 23 is fully charged. Alternatively a different threshold of remaining battery charge may be employed as a triggering condition, for example a battery charge that is less than about 10% of full charge, a battery charge that is less than about 5% of full charge, or another charge threshold. In an embodiment, the method 300 may comprise that the subsequent communication channel 17 comprises at least one of a wireless communication channel or a wired communication channel. In an embodiment, the method 300 may comprise that the subsequent communication channel 17 comprises a communication channel to a different communication device than the wireless communication device. In an embodiment, the method 300 may comprise that the initial communication channel 15a and the subsequent communication channel 15b direct communication to the mobile communication device 12.

In an embodiment, the method 300 may comprise that the forwarding instruction instructs the server 40 to redirect a communication source identification designated for transmission through the initial communication channel 15a and/or 15b to the subsequent communication channel 17, wherein the communication source identification is associated with the communication, and wherein the communication source identification provides an identification of the communication source to a communication receiver. In an embodiment, the method 300 may comprise that the forwarding instruction instructs the server 40 to block the redirection of communication designated for transmission through the initial communication channel 15a and/or 15b to the subsequent communication channel 17 when a communication source has blocked the transmission of a communication source identification associated with the communication, wherein the communication source identification provides an identification of the communication source to a communication receiver.

Figure 4:
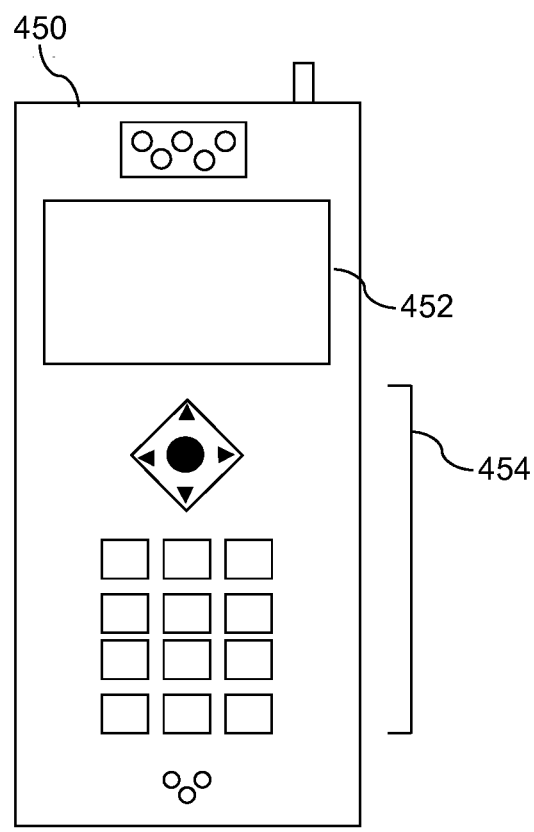
FIG. 4 is an illustration of a mobile device according to an embodiment of the disclosure.

FIG. 4 depicts the mobile device 450, which is operable for implementing aspects of the present disclosure, but the present disclosure should not be limited to these implementations. Though illustrated as a mobile phone, the mobile device 450 may take various forms including a wireless handset, a pager, a personal digital assistant (PDA), a gaming device, or a media player. The mobile device 450 includes a display 452 and a touch-sensitive surface and/or keys 454 for input by a user. The mobile device 450 may present options for the user to select, controls for the user to actuate, and/or cursors or other indicators for the user to direct. The mobile device 450 may further accept data entry from the user, including numbers to dial or various parameter values for configuring the operation of the handset. The mobile device 450 may further execute one or more software or firmware applications in response to user commands. These applications may configure the mobile device 450 to perform various customized functions in response to user interaction. Additionally, the mobile device 450 may be programmed and/or configured over-the-air, for example from a wireless base station, a wireless access point, or a peer mobile device 450. The mobile device 450 may execute a web browser application which enables the display 452 to show a web page. The web page may be obtained via wireless communications with a base transceiver station, a wireless network access node, a peer mobile device 450 or any other wireless communication network or system.

Figure 5:
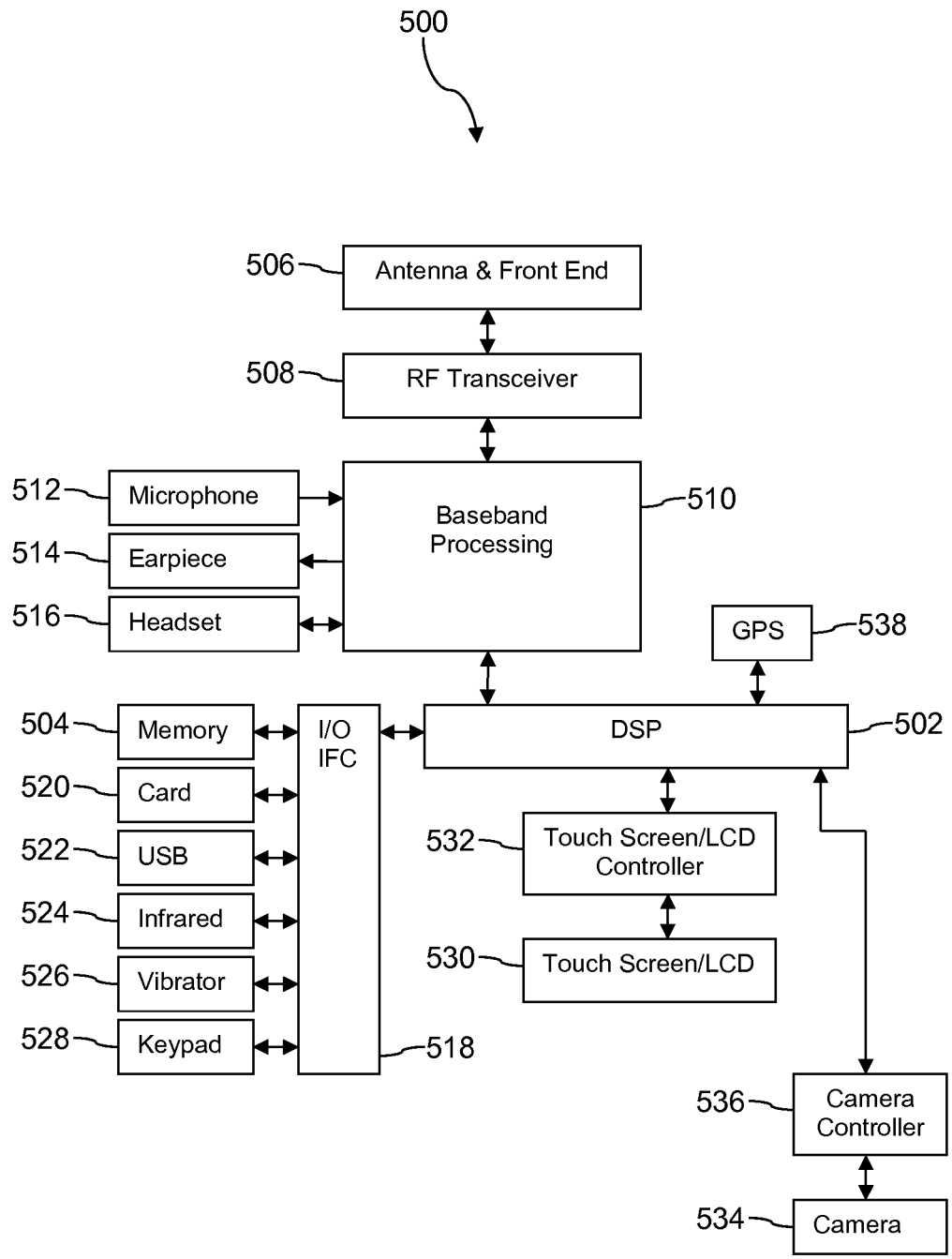
FIG. 5 is a block diagram of a mobile device according to an embodiment of the disclosure.

FIG. 5 shows a block diagram of the mobile device 450. While a variety of known components of handsets are depicted, in an embodiment a subset of the listed components and/or additional components not listed may be included in the mobile device 450. The mobile device 450 includes a digital signal processor (DSP) 502 and a memory 504. As shown, the mobile device 450 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 450 may include another kind of display that does not provide a touch sensitive screen. In an embodiment, the DSP 502 may communicate directly with the memory 504 without passing through the input/output interface 518. Additionally, in an embodiment, the mobile device 450 may comprise other peripheral devices that provide other functionality.

The DSP 502 or some other form of controller or central processing unit operates to control the various components of the mobile device 450 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 450 to function as a peripheral device to exchange information with a personal computer or other computer system. The infrared port 524 and other optional ports such as a Bluetooth® interface or an IEEE 802.11 compliant wireless interface may enable the mobile device 450 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 450. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 450 to determine its position.

Figure 6A:
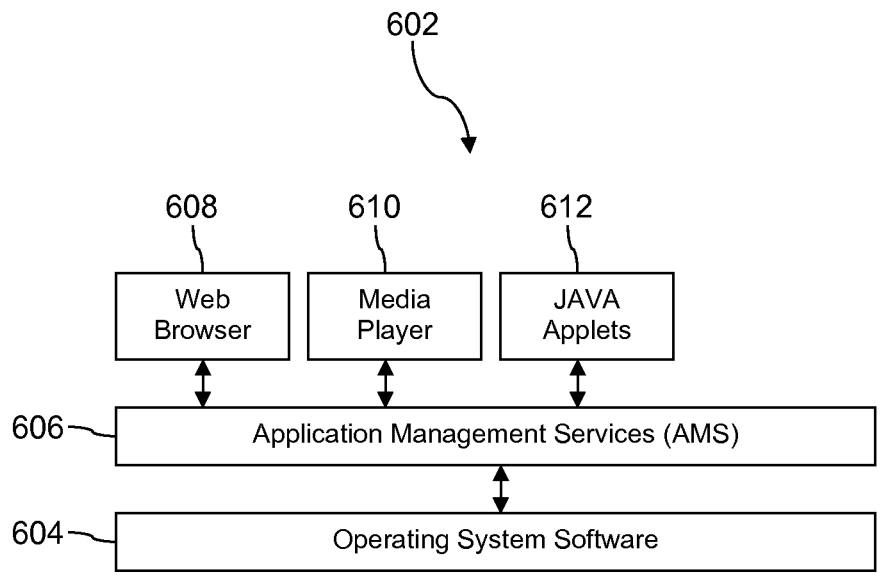
FIGS. 6A and 6B are block diagrams of software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 450. Also shown in FIG. 6A are a web browser application 608, a media player application 610, and JAVA applets 612. The web browser application 608 may be executed by the mobile device 450 to browse content and/or the Internet, for example when the mobile device 450 is coupled to a network via a wireless link. The web browser application 608 may permit a user to enter information into forms and select links to retrieve and view web pages. The media player application 610 may be executed by the mobile device 450 to play audio or audiovisual media. The JAVA applets 612 may be executed by the mobile device 450 to provide a variety of functionality including games, utilities, and other functionality. It is understood that the software environment 602 may comprise other components such as C language programs or applications, C++ language programs or applications, JAVA language programs or applications, scripts, or other programs, logic, or codes.

Figure 6B:
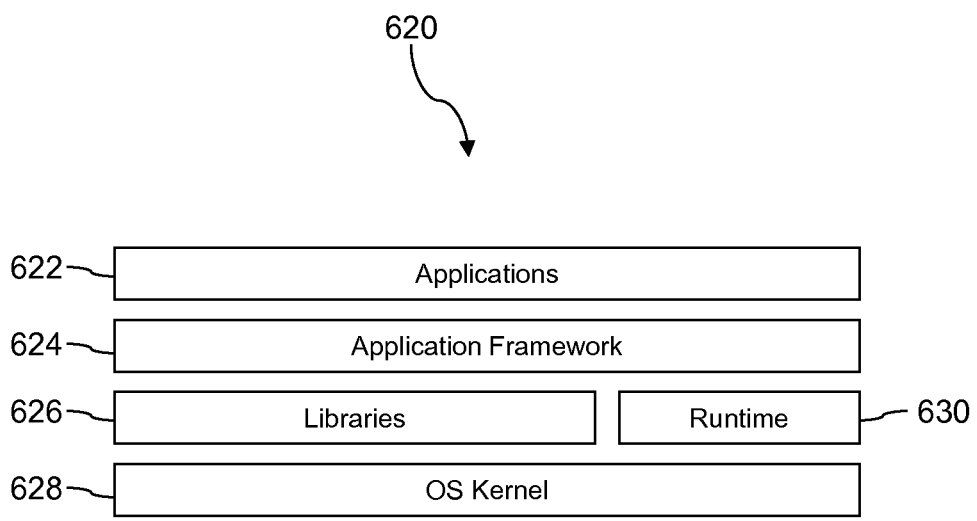

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
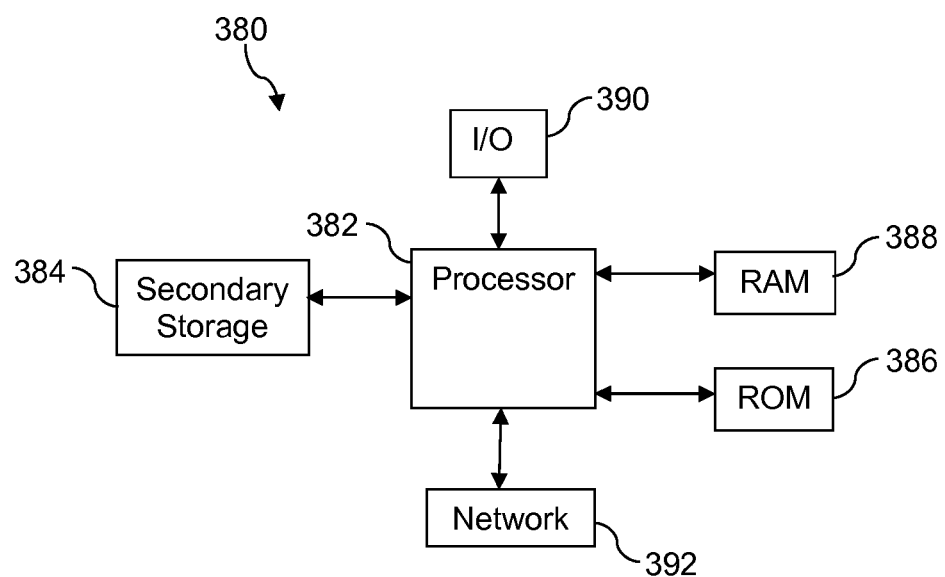
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A mobile communication device, comprising:
a long-range radio transceiver configured to communicatively couple the mobile communication device with a network and a server corresponding to a wireless provider;
a first short-range radio transceiver configured to communicatively couple with a second mobile communication device;
a processor of the mobile communication device;
a non-transitory memory of the mobile communication device; and
an application on the mobile communication device stored in the non-transitory memory that, upon execution by the processor, configures at least the processor to:
detect an event in which a long-range radio signal strength received by the long-range radio transceiver is below a predefined threshold strength level,
in response to the mobile communication device detecting the event that the long-range radio signal strength is below the predefined threshold:
select an entry from a call forwarding map stored in the non-transitory memory on the mobile communication device based on a current location of the mobile communication device in the network, wherein the entry comprises a reference to the second communication device that is a separate user device having a second short-range radio transceiver configured for communication with the first short-range radio transceiver of the mobile communication device,
create a redirect message based on the entry selected, wherein the redirect message comprises the reference to the second communication device, a mobile phone number of the mobile communication device, and a security code associated with the second communication device and instructs the server of the network to redirect communications designated for the long-range radio transceiver to the mobile communication device through the second short-range radio transceiver of the second communication device,
transmit the redirect message via the long-range radio transceiver of the mobile communication device to the server of the network, and
in response to transmission of the redirect message by the mobile communication device, receive voice calls on the first short-range radio transceiver via the second short-range radio transceiver of the second communication device.

2. The device of claim 1, wherein the long-range radio transceiver is configured to transmit and receive over distances of at least three miles.

3. The device of claim 1, wherein the long-range radio transceiver is configured to communicate according to at least one of a code division multiple access (CDMA) wireless communication protocol, a global system for mobile communications (GSM) wireless communication protocol, a long term evolution (LTE) wireless communication protocol, a worldwide interoperability for microwave access (WiMAX) wireless communication protocol, or any combination thereof.

4. The device of claim 1, wherein the first short-range radio transceiver includes at least one of a WiFi radio transceiver, a Bluetooth radio transceiver, a near-field communication (NFC) radio transceiver, or any combination thereof.

5. The device of claim 1, wherein the event includes a radio signal strength indicator (RSSI) associated with the mobile communication device falling below a predefined threshold radio signal strength value.

6. The device of claim 1, wherein the event includes a battery power level of the mobile communication device falling below a predefined threshold battery power level.

7. The device of claim 1, wherein the event includes the current location of the mobile communication device approaching a predefined location, and wherein detection of the event includes determination that the mobile communication device is currently located at, or approaching, the predefined location.

8. A mobile communication device, comprising:
 a long-range radio transceiver configured to communicatively couple the mobile communication device with a network and a server corresponding to a wireless provider;
 a first short-range radio transceiver of the mobile communication device;
 a processor of the mobile communication device;
 a non-transitory memory of the mobile communication device; and
 an application on the mobile communication device stored in the non-transitory memory that, upon execution by the processor, configures at least the processor to:
  execute a discovery session, via the first short-range radio transceiver, with a second short-range radio transceiver of a second communication device that is a user device, wherein the discovery session comprises the first short-range radio transceiver receiving a message comprising a reference to the second communication device from the second short-range radio transceiver,
  determine that a long-range radio signal strength received by the long-range radio transceiver is below a predefined threshold strength level,
  in response to the determination that the long-range radio signal strength is below the predefined threshold, create a redirect message based on the discovery session, wherein the redirect message instructs the server of the network to redirect communications designated for the long-range radio transceiver to the mobile communication device through the second short-range radio transceiver of the second communication device,
  transmit the redirect message via the long-range radio transceiver to the server of the network, the redirect message comprising the reference to the second communication device, a mobile phone number of the mobile communication device, and a security code associated with the second communication device, and in response to transmission of the redirect message, receive, by the first short-range radio transceiver a voice call via the second short-range radio transceiver of the second communication device, wherein the voice call was designated for the mobile communication device and redirected by the server through the second short-range radio transceiver to the mobile communication device.

9. The device of claim 8, wherein the first short-range radio transceiver includes at least one of a WiFi radio transceiver, a Bluetooth radio transceiver, or a near-field-communication (NFC) radio transceiver.

10. The device of claim 8, wherein the long-range radio transceiver is configured to communicate according to at least one of a code division multiple access (CDMA) wireless communication protocol, a global system for mobile communications (GSM) wireless communication protocol, a long term evolution (LTE) wireless communication protocol, or a worldwide interoperability for microwave access (WiMAX) wireless communication protocol.

11. The device of claim 8, wherein the discovery session further comprises the first short-range radio transceiver receiving a message comprising the security code associated with the second communication device from the second-short range radio transceiver.

12. The device of claim 8, wherein the message received from the second short-range radio transceiver further comprises at least one of an internet protocol address of the second communication device, a domain name of the second communication device, or any combination thereof.

13. The device of claim 8, wherein the redirect message further comprises a time limit, wherein voice calls directed to the mobile phone number of the mobile communication device cease to be routed via the second communication device after expiration of the time limit, and wherein the mobile communication device resumes reception of voice calls directed to the mobile phone number via the long-range radio transceiver of the mobile communication device subsequent to expiration of the time limit.

14. The device of claim 8, wherein the long-range radio transceiver is configured to transmit and receive over distances of at least three miles.

15. A method of routing a voice call directed to a mobile phone number of a mobile communication device, comprising:
 conducting, by the mobile communication device executing an application on a processor, a discovery session between the mobile communication device and a WiFi access point, wherein the mobile communication device learns an internet protocol address of the WiFi access point and a security code of the WiFi access point during the discovery session;
 determining, by the mobile communication device executing the application, that a long-range radio signal strength received by a long-range radio transceiver of the mobile communication device is below a predefined threshold strength level;
 in response to determining that the long-range radio signal strength is below the predefined threshold:
  creating, by the mobile communication device executing the application, a redirect message that activates a redirect function of a server application and instructs communications designated for the long-range radio transceiver to be redirected to the mobile communication device through the WiFi access point, and transmitting, by the mobile communication device executing the application, the redirect message via the long-range radio transceiver, wherein the redirect message comprises the mobile phone number of the mobile communication device, the internet protocol address of the WiFi access point, and the security code of the WiFi access point; and in response to transmitting the redirect message, receiving a voice call on the mobile communication device by a WiFi radio transceiver of the mobile communication device via the WiFi access point, wherein the voice call was designated for the mobile communication device and redirected through the WiFi access point to the mobile communication device based on the redirect message.

16. The method of claim 15, wherein the redirect message comprises a time limit, wherein voice calls directed to the mobile phone number of the mobile communication device cease to be redirected via the WiFi access point after expiration of the time limit, and wherein the mobile communication device resumes receiving voice calls directed to the mobile phone number via the long-range radio transceiver of the mobile communication device subsequent to expiration of the time limit.

17. The method of claim 16, wherein the time limit is received by the mobile communication device from the WiFi access point during the discovery session.

18. The method of claim 15, wherein the long-range radio transceiver is configured to communicate according to at least one of a code division multiple access (CDMA) wireless communication protocol, a global system for mobile communications (GSM) wireless communication protocol, a long term evolution (LTE) wireless communication protocol, or a worldwide interoperability for microwave access (WiMAX) wireless communication protocol.

19. The method of claim 15, wherein the mobile communication device comprises at least one of a mobile phone, a personal digital assistant (PDA), a media player, or any combination thereof.

20. The method of claim 15, further comprising:
determining that a battery power level of the mobile communication device is below a predefined threshold, wherein transmitting the redirect message via the long-range radio transceiver is in response to determining the battery power level is below the predefined threshold.

* * * * *